Figure 3:
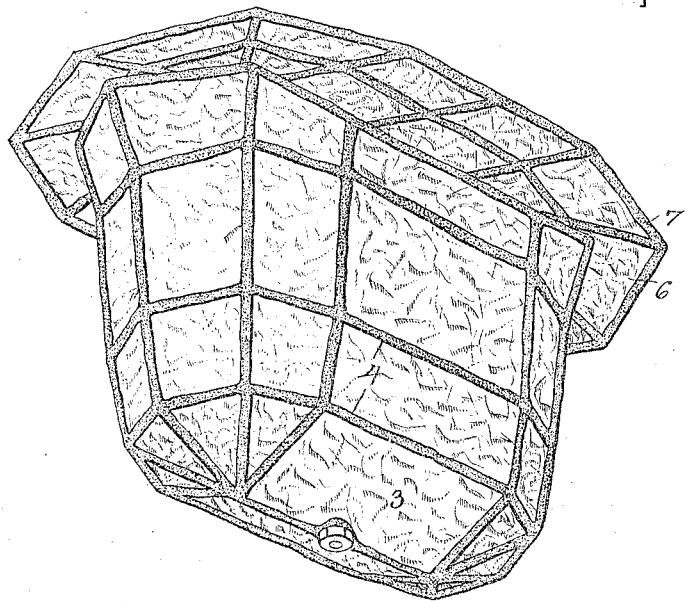

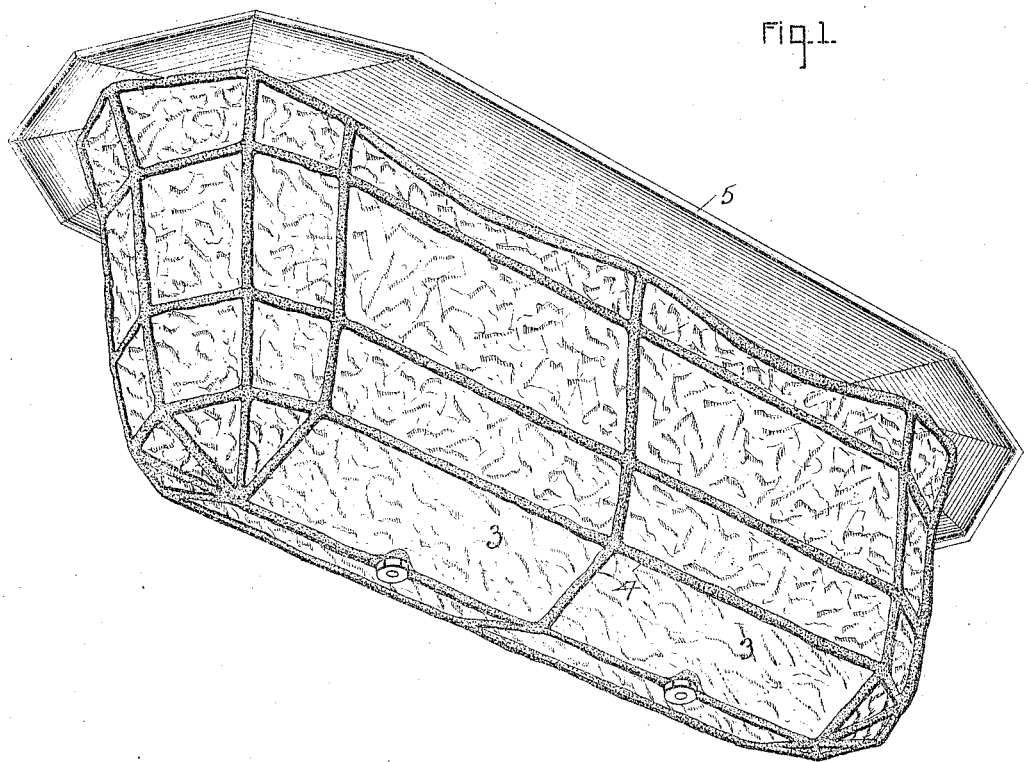
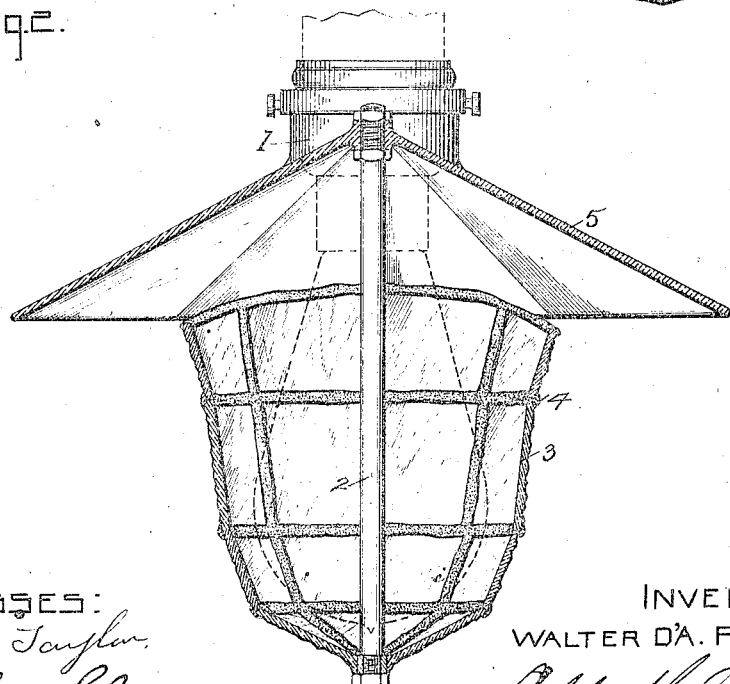

W. D'A. RYAN.
ILLUMINATOR.
APPLICATION FILED FEB. 18, 1909.

1,091,710.

Patented Mar. 31, 1914.
2 SHEETS—SHEET 2.

WITNESSES:
W. Gay Taylor.
J. Ellis Glen.

INVENTOR:
WALTER D'A. RYAN
BY
ATTY.

UNITED STATES PATENT OFFICE.

WALTER D'A. RYAN, OF WATERTOWN, SOUTH DAKOTA, ASSIGNOR TO GENERAL ELECTRIC COMPANY, A CORPORATION OF NEW YORK.

ILLUMINATOR.

1,091,710.      Specification of Letters Patent.      Patented Mar. 31, 1914.

Application filed February 18, 1909. Serial No. 478,711.

*To all whom it may concern:*

Be it known that I, WALTER D'A. RYAN, a subject of the King of Great Britain, residing at Watertown, county of Coddington, State of South Dakota, have invented certain new and useful Improvements in Illuminators, of which the following is a specification.

My invention relates to illuminating devices for producing a soft and uniform illumination and more particularly to illuminating devices of the type in which a source of light of great brilliancy is shielded or protected in such a manner that no direct rays of light of great intensity strike the eye of the observer and the light is so softened and diffused that it is rendered agreeable to the eye.

The direct light from unshielded arc lamps and incandescent lamps having filaments of high brilliancy is injurious and disagreeable to the eye and it has been proposed to secure a uniform and agreeable illumination from such lamps by inclosing or otherwise shielding the lamp by means of a translucent shade of porcelain, opal glass, or similar material; by concealing the lamp from the observer by an opaque shade with a reflector placed to direct the rays of light in the desired direction, and also by using incandescent lamps with part of the bulb frosted or etched for the purpose of diffusing the light from the filament, there being used in connection with the frosted incandescent lamp some form of reflector arranged to reflect the light passing through the clear part of the bulb and to mingle the reflected rays with the rays passing through the frosted portion of the lamp.
It has been found that if the translucent porcelain or glass shade is made thin enough to transmit enough light to be of any value, the source of light becomes visible and is of sufficient intensity to be harmful to the eye; the systems of illumination in which the lamps are entirely concealed and the light is directed solely by means of reflectors are inefficient and produce a disagreeable effect on the eye; while a lamp bulb which has been frosted or etched diffuses the light to a certain extent, but produces the same effect as though its surface were cut into a great number of reflecting planes or facets, so that the rays of light passing through the frosted portion of the bulb are divided into numerous regular pencils of light, which produce practically the same dazzling and injurious effect on the eye as the direct rays from the unshielded portion of the filament.

The object of my invention is to provide an illuminating device in which lamps having a high intrinsic brilliancy can be used to produce a soft and uniform illumination; in which the effect produced is agreeable to the eye and in which the lamp is so protected and shielded that direct rays of light from the lamp cannot reach the eye of the observer.

In carrying out my invention the source of light is concealed from the observer by a translucent shade, preferably constructed of material having a color agreeable to the eye and provided with an irregularly undulating roughened or wavy surface for producing an irregular dispersion or diffusion of the transmitted light. No two unit areas of the roughened or wavy surface of the glass are similar and every portion of the surface differs in shape and diffusing properties from every adjoining portion. With a shade constructed in this manner the rays of light transmitted through the shade can never assume the form of well defined pencils or beams of light as in the case of light transmitted through frosted glass. The shade may be made of any suitable material, preferably of what is known as "art glass" which can be procured in various colors and of various thicknesses, and has one side smooth, while the opposite side is irregularly undulating or wavy. The shade is formed by uniting pieces of art glass by means of lead in the customary manner, but with the smooth side of the glass toward the source of light. The shade is preferably in the form of a dish or cup mounted with the open end upward and in a position to surround the source of light. Any suitable reflector is mounted above the open end of the shade and the light received from the complete illuminating device consists of the light transmitted through the art glass and thereby irregularly diffused and softened, and also of the reflected rays of light which the reflector causes to mingle with the rays transmitted through the shade. The parts are so proportioned that the source of light is completely concealed from the eye of the observer and the result obtained is an even and uniform illumination which has been found in practice to be very agreeable to the eye.

While any type of reflector may be used as part of my illuminating device, it is often desirable to construct a reflector which will disperse the reflected rays of light in an irregular manner to soften them and render them agreeable to the eye. The preferred form of reflector for securing this result is made of art glass with the rough or wavy side toward the source of light and preferably with a backing on the smooth side of silver or some similar reflecting material to cause all the rays of light which pass through the rough surface of the art glass to be reflected back through the rough surface and thereby be softened and diffused, whereby all the light reflected from the art glass reflector is rendered agreeable to the eye.

My invention will best be understood in connection with the accompanying drawings, which are merely illustrations of some of the many various forms in which the invention may be embodied and in which—

Figure 1 is a perspective view of one form of device with the shade made of art glass and provided with a reflector of the ordinary type; Fig. 2 a cross-section of the device shown in Fig. 1; Fig. 3 a perspective view of an art glass shade provided with an art glass reflector, and Fig. 4 a cross-section of the device shown in Fig. 3.

In the specific embodiment of my invention shown in the drawings, an incandescent lamp having a metallic or other filament of great intrinsic brilliancy is mounted in a socket 1, as indicated in the drawing by dotted lines, and the filament of the lamp is shielded from the eye of the observer by means of a shade which is held in proper relation to the lamp by means of a supporting rod 2 connected to the socket at its upper end and to the shade at its lower end. As shown in Figs. 1 and 2, the shade is made preferably in the form of a dish or bell and is mounted with the open end upward, as shown in Fig. 2, in such a relation to the lamp that the filament of the lamp is practically inclosed by the shade, although the relation of the shade to the lamp may be varied to any extent, as long as the shade completely hides the filament from the eye of the observer.

Figure 4:
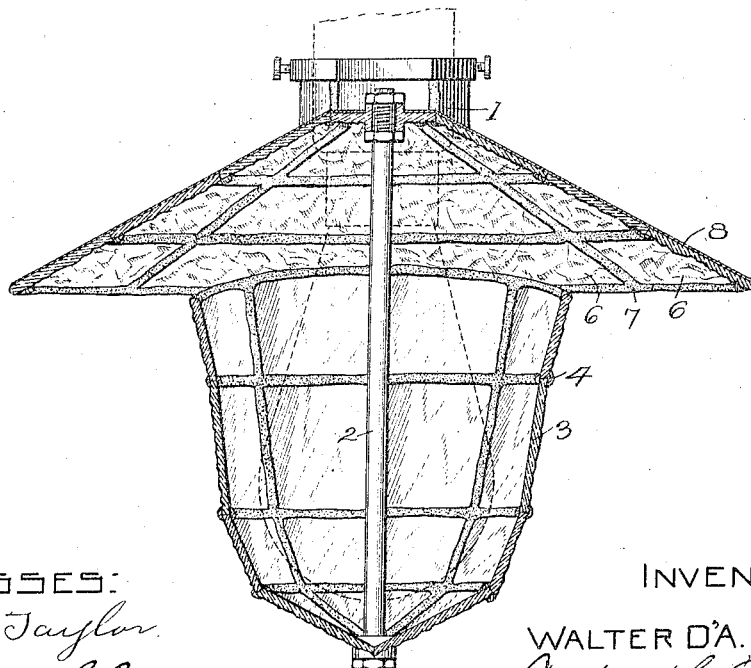

As best shown in Figs. 2 and 4, the shade is constructed of pieces of art glass 3 held together by lead 4 in the customary manner. One side of the art glass or similar translucent material is smooth and the other side is roughened by irregular undulations or waves. The pieces of art glass are mounted with the smooth side in, so that the interior of the shade is comparatively smooth, while the exterior is roughened and wavy. The art glass is more or less translucent, depending upon its thickness and color, and part of the light from the lamp is reflected from the smooth inner surface of the shade, while another part is transmitted through the art glass and is irregularly diffused and thereby softened by the irregularly roughened and wavy outer surface of the glass. A further advantage is secured in constructing the shade in the manner above described, since the smooth inner surface of the glass facilitates the removal of the dust which tends to collect in a shade of the form shown in the drawings, while it would be very difficult to clean a shade of this type if the rough side of the glass were in and became covered with dust.

In the specific form of device shown in Figs. 1 and 2 the direct light from the lamp and the light which is reflected from the smooth inner surface of the shade is intercepted by any suitable reflector 5 mounted immediately above the shade and shaped to cause the reflected rays to mingle with the light transmitted through the translucent shade, thereby producing a uniform illumination which is agreeable to the eye. The shade 5, as shown in Fig. 2, extends down far enough to intercept all the rays of light from the filament which do not pass through the shade so that it is impossible for the observer to look directly at an unshielded portion of the filament of the lamp.

While the form of illuminating device above described produces a very even and agreeable illumination, it is desirable under some circumstances to further modify and diffuse the light by means of a reflector having an irregularly roughened or wavy surface and in accordance with my invention, a reflector of this kind is secured, as shown in Fig. 4, by fastening together pieces 6 of art glass by means of lead 7 in the customary manner. The reflector is so formed that the roughened or wavy side of the art glass is toward the lamp and, if desired, the smooth side of the glass may be covered with a reflecting film 8 of silver or similar material. With a reflector constructed in this manner, the direct rays of light from the filament of the lamp impinge upon the roughened surface of the reflector and are thereby irregularly diffused and softened. A portion of the light passing through the roughened surface of the art glass is reflected by the metallic surface 8 and is still further diffused and softened as it passes the second time through the roughened or wavy surface of the glass.

A reflector constructed as above described may be used in connection with an opaque shade in which case the reflected light will be diffused and softened and thereby rendered agreeable to the eye, or, in the preferred construction, both the shade and the reflector are constructed of art glass, as shown in Figs. 3 and 4, and the illumination secured is exceedingly uniform and of a very desirable quality.

It is obvious that various changes and modifications may be made in my invention and that under some circumstances it may be desirable to make part of the shade of glass which is considerably thicker and more opaque than the remainder, while under some circumstances, as in picture galleries, it may be desirable to make that side of the shade which is toward the observer of glass which is practically opaque, and thereby direct practically all the light of the lamp through the glass on the other side of the shade and toward the pictures, thereby producing a very even illumination of the pictures and displaying them under the best conditions. These and similar changes and modifications which are within the spirit and scope of my invention are intended to be included in the scope of the appended claims.

What I claim as new and desire to secure by Letters Patent of the United States, is,—

1. In an illuminating device the combination with a lamp, of a shade shaped to partially inclose said lamp having light transmitting walls with an inner smooth surface toward the lamp and an outer irregularly wavy surface any two unit areas of which are dissimilar in configuration whereby an irregular dispersion of the transmitted light is produced, and means arranged for mingling the light from the interior of said shade with the light transmitted through said walls.

2. In an illuminating device the combination with a lamp, of a shade shaped to partially inclose said lamp having translucent walls made of pieces of glass each having a flat smooth surface on one side and an irregularly wavy surface on the other side any two unit areas of which are dissimilar, said pieces being arranged with their smooth surface toward said lamp whereby the irregularly wavy surface produces an irregular dispersion of the transmitted light, and means mounted to mingle the light from the interior of said shade with the irregularly dispersed light.

3. An illuminating device comprising with a lamp, a lamp shade in the form of an open ended vessel having light transmitting walls with a flat smooth inner surface and an irregular wavy outer surface any two unit areas of which are dissimilar, means for holding said shade with the open end up and in position to partially inclose said lamp whereby the irregularly wavy surface produces an irregular dispersion of the transmitted light, and means adjacent said open end to intercept the light from the interior of said shade and mingle it with the transmitted light.

4. An illuminating device comprising with a lamp, a lamp shade shaped to partially inclose said lamp having translucent walls with a flat smooth inner surface and an irregular wavy outer surface any two unit areas of which are dissimilar whereby the light transmitted through said irregularly wavy surface is irregularly dispersed, and a reflector mounted to mingle the reflected light from the interior of said shade with the irregularly dispersed transmitted light.

5. In an illuminating device, the combination with a lamp, of a shade shaped to partially inclose said lamp and having translucent walls made of pieces of glass each having a flat smooth inner surface and an irregularly wavy outer surface, and a reflector mounted to mingle the light from the interior of said shade with the light transmitted through said translucent walls.

6. In an illuminating device, the combination with a lamp, of a lamp shade in the form of an open-ended vessel having translucent walls made of pieces of glass, each having a flat smooth inner surface and an irregularly wavy outer surface, means for holding said shade with the open end up and in position to partially inclose said lamp, and a reflector mounted adjacent to said open end to intercept the light from the interior of said shade and mingle it with the light transmitted through said shade, said reflector being composed of pieces of glass flat and smooth on one side and irregularly wavy on the other, said pieces being mounted with the wavy sides toward the lamp.

In witness whereof, I have hereunto set my hand this 15th day of February, 1909.

WALTER D'A. RYAN.

Witnesses:
 BENJAMIN B. HULL,
 HELEN ORFORD.